(12) United States Patent
Sankarapandian et al.

(10) Patent No.: US 10,742,837 B1
(45) Date of Patent: Aug. 11, 2020

(54) SYSTEM AND METHOD FOR CREATING AND OPERATING LOW-POWER WIDE AREA NETWORK FOR INTERNET OF THINGS (IOT)

(71) Applicant: FUJI XEROX CO., LTD., Minato-ku, Tokyo (JP)

(72) Inventors: Kandha Sankarapandian, San Jose, CA (US); Steven Cebertowicz, San Francisco, CA (US); Zachary Gianos, Burlingame, CA (US); David M. Hilbert, Palo Alto, CA (US); Yasha Spong, Oakland, CA (US); Venkat Ram Sriram, Saratoga, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/270,433

(22) Filed: Feb. 7, 2019

(51) Int. Cl.
*H04W 8/00* (2009.01)
*H04N 1/32* (2006.01)
*H04N 1/00* (2006.01)
*H04W 84/18* (2009.01)

(52) U.S. Cl.
CPC ..... *H04N 1/32545* (2013.01); *H04N 1/00896* (2013.01); *H04N 2201/0094* (2013.01); *H04W 84/18* (2013.01)

(58) Field of Classification Search
None
See application file for complete search history.

(56) References Cited

U.S. PATENT DOCUMENTS

| 7,102,796 B2 | 9/2006 | Frederiksen | |
|---|---|---|---|
| 2008/0162697 A1 | 7/2008 | Griffin et al. | |
| 2013/0063763 A1* | 3/2013 | Tse | H04N 1/00127 358/1.15 |
| 2016/0119931 A1* | 4/2016 | Soriaga | H04W 52/028 370/329 |

* cited by examiner

*Primary Examiner* — Andrew H Lam
(74) *Attorney, Agent, or Firm* — Procopio, Cory, Hargreaves & Savitch LLP (57) ABSTRACT

A method of managing a low-power wide area blockchain network having multifunction printers (MFPs) as nodes in a radio frequency (RF) mesh is provided. The method includes configuring the RF mesh based on MFP characteristics including RF reception, compute, storage and uplink, for each of the MFPs. The method also includes operating the RF mesh to dynamically determine a role of the MFPs based on the MFP characteristics, current power save and processing state, for each of the MFPs and its neighboring MFPs, based on a function that minimizes delay, balances load and/or transitions MFPs between a sleep mode and a wake mode.

19 Claims, 9 Drawing Sheets
(2 of 9 Drawing Sheet(s) Filed in Color)

SYSTEM AND METHOD FOR CREATING AND OPERATING LOW-POWER WIDE AREA NETWORK FOR INTERNET OF THINGS (IOT)

BACKGROUND

Field

Aspects of the example implementations relate to methods, systems and user experiences associated with creating and operating a low-power wide area network (LP WAN) for Internet of things (IoT) applications.

Related Art

In the related art, there are IoT networks. For example, a plurality of nodes, which may include dedicated RF receivers, are interconnected to create a low-power wide area network (LP WAN), with backhaul to the Internet. More specifically, low power wireless IoT devices send sensor data through the network via an RF link to nodes that are within a range. The sensor data consisting of the timestamp as reported by the sensor and the time of flight (ToF) as measured by one or more receivers are cryptographically hashed and stored in a blockchain. Further, the IoT device location is estimated via a time delay of arrival (TDoA) algorithm. using the verifiable ToF information stored in the blockchain.

Figure 1:
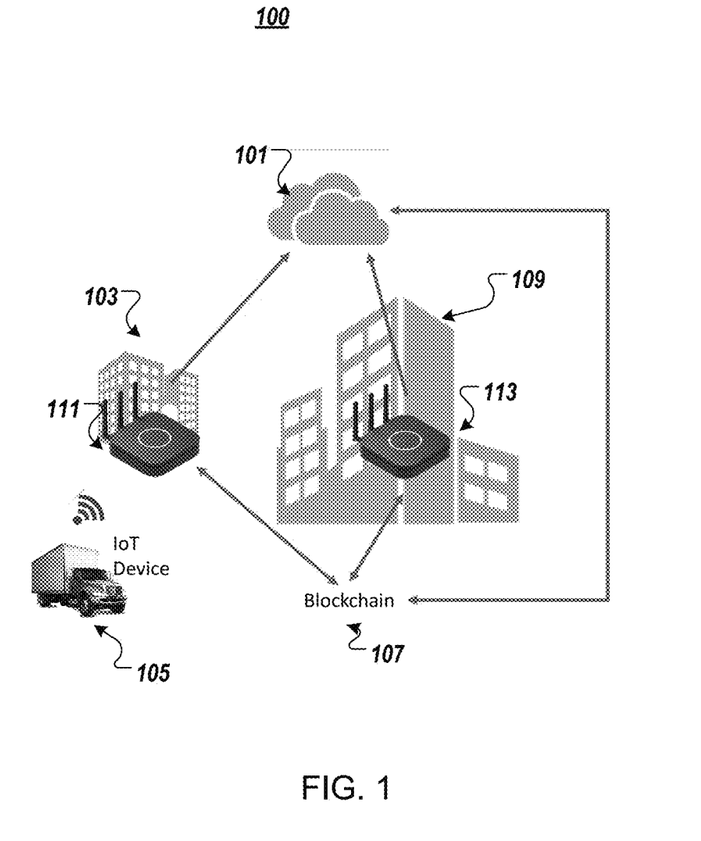
FIG. 1 illustrates a related art approach for an IoT blockchain network.

FIG. 1 illustrates a related art IoT blockchain network 100. For example, a plurality of dedicated RF receivers that are distributed across a geography are shown at 111 and 113. The nodes may communicate with a remote storage function such as the cloud 101, via the Internet. Further, an IoT sensor associated with a body, such as a moving body, is shown at 105. In this related art configuration, the nodes 111 and 113 provide power, computation and Internet backhaul.

Accordingly, in the related art, RF receivers are deployed to create a low-cost LP WAN with Internet backhaul. The RF receivers can provide a range of about 6 miles of coverage. Further, the low-power wireless IoT devices may transmit sensor data to the receivers that are within the range of the IoT devices.

More specifically in FIG. 1, a moving body having an IoT device 105 may come within the range of RF receivers 111, 113 that are located at geographically distinct buildings 103, 109, respectively. The sensor data is hashed and stored as explained above in a blockchain 107, and may be further stored, via Internet at cloud 101.

However, the related art may have various problems and disadvantages. For example, but not by way of limitation, in the related art IoT blockchain network, a great deal of power is consumed. The related art requires wide-spread deployment of a specialized, single purpose RF receiver. Further when the RF receiver is not able to receive the signal, or has limited capabilities with respect to storing, processing or communicating information, the LP WAN may not be able to perform its functions as a series of connections that are sharing a resource. Also, there is no related art approach that considers individual MFP capability in managing the overall LP WAN.

SUMMARY

According to aspects of the example implementations, a method of managing a low-power wide area blockchain network is provided, having multifunction printers (MFPs) and non-MFP devices as nodes in a radio frequency (RF) mesh is provided. The method includes configuring the RF mesh based on MFP characteristics including RF reception, compute, storage and uplink, for each of the MFPs. The method also includes operating the RF mesh to dynamically determine a role of the MFPs based on the MFP characteristics, current power save and processing state, for each of the MFPs and its neighboring MFPs, based on a function that minimizes delay, balances load and/or transitions MFPs between a sleep mode and a wake mode.

According to another aspect, the configuring the RF mesh comprises determining at least one of an Internet backhaul reliability, processing power, and an RF visibility for an MFP to neighboring MFPs; and based on a result of the determining, tagging the MFP as at least one of a relay node, a processing node, and an uplink node.

According to yet another aspect, the determining the Internet backhaul reliability comprises checking an uplink between the MFP and the Internet, and for the uplink between the MFP and the Internet being connected, tagging the MFP as the uplink node.

According to still another aspect, the determining the processing power comprises checking a processor of the MFP, and for the processor meeting a processing capability requirement, tagging the MFP as the processing node.

According to an additional aspect, the determining the RF visibility comprises an RF receiver of the MFP performing a scan operation to receive an incoming RF broadcast signal, and for the scan operation resulting in identification of one or more of the neighboring MFPs based on the incoming RF broadcast signal, or for the MFP being tagged as an uplink node and/or a processing node, tagging the MFP as the relay node.

According to another aspect, the example implementations include, after the tagging of the MFP as the relay node, the processing node, and/or the uplink node, further tagging the MFP with geo-coordinates, and providing capability information associated with the MFP in the blockchain network. Further, the geo-coordinates of the MFP may be registered during commissioning by a technician or by using location detecting hardware in the MFP, and requiring re-registration of the MFP when a location of the MFP changes, or based on a power-cycling of the MFP.

According to yet another aspect, additional nodes are provided in the RF mesh that are not MFPs.

According to an additional aspect, the MFP characteristics further comprise a physical location of the MFPs, and wherein the operating the RF mesh is performed based on MFP status that comprises one or more of a sleep/wake state and a job queue of the MFP, and MFP historical data that comprises one or more of a power consumption and a job history of the MFP.

According to yet another aspect, the operating comprises (a) the MFP receiving an RF signal, and for the MFP being the relay node in the sleep mode, rebroadcasting the RF signal; (b) for the MFP not being in the sleep mode and being in a busy state, storing information associated with the RF signal at the MFP; (c) for the MFP not being in the sleep mode and not being in the busy state, or the MFP not being the relay node and the MFP being in the sleep mode, determining if the RF signal requires processing; (d) for the RF signal requiring processing and the MFP being the process node, when the MFP is not in the sleep mode, performing the processing, and when the MFP is in the sleep mode, determining whether to transition the MFP from the sleep mode to the wake mode, and for a determination to transition the MFP from the sleep mode to the wake mode, transitioning the MFP from the sleep mode to the wake mode and performing the (c); and (e) after the processing, or if the RF signal does not require the processing, for the MFP being an uplink node not in the sleep mode, writing the RF signal to the blockchain network, or for the MFP not being the uplink node and the MFP being the relay node, performing the rebroadcasting, or for the MFP being the uplink node in the sleep mode, determining whether to transition the MFP from the sleep mode to the wake mode, and for the determination to transition the MFP from the sleep mode to the wake mode, transitioning the MFP from the sleep mode to the wake mode and performing the (e). Additionally, the operating may further comprise selecting an idle one of the MFPs before selecting a busy one of the MFPs, and the busy one of the MFPs having a low or current computational load to minimize delay; also, the selecting the busy one of the MFPs may be performed based on:

$$F=\min f_{CL}(M_i) \text{ if } I=\emptyset, I=\{M_i|f_A(M_i)=\text{Idle}\} \forall M_i \in N \text{ neighbors.}$$

Also, the determining whether to transition the MFP from the sleep mode to the wake mode is based on a cost of relay (R) including an ability of the MFP to complete a process on its own or using neighbors, a likelihood of the MFP to wake up, and a likelihood of transmission (LT) including an expected route of an IoT device that transmits the RF signal; the determining whether to transition the MFP from the sleep mode to the wake mode may be performed based on:

$$F=\max f(f_{R,i}, L_{T,i}, L_{J,i}), f_{R,i}=\min f_R(M_j, L_{Jj}, L_{Tj}) \forall M_i, M_j \in N \text{ neighbors.}$$

Further, wherein MFP load is balanced based on past power consumption (P).

The method of claim 15, wherein the MFP load may be balanced based on:

$$F=\min \max f_P(M_i) \forall M_i \in N \text{ neighbors.}$$

According to another aspect, the low-power wide area blockchain network does not use a cellular communication network.

Example implementations may also include a non-transitory computer readable medium having a storage and processor, the processor capable of executing instructions for controlling access to an enclosed area having a boundary, as well as a system for controlling access to a controlled-access environment having a boundary and an access point.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are related to systems and methods associated with transforming a dense deployment of multi-function printers (e.g., MFPs) into a low-cost, low power wide area network (LP WAN), to support IoT applications. For example but not by way of limitation, the IoT applications may include, but are not limited to, supply-chain monitoring, smart cities, people monitoring, and asset monitoring.

More specifically, radio frequency (RF) receivers are embedded in MFPs that are densely deployed across a geography (e.g., in convenience stores or the like across a city or region, or even a country). When a wireless IoT device, which may be associated with a moving body such as a delivery vehicle or the like, passes through a coverage area associated with the RF receiver, an MFP blockchain network performs one or more operations. The one or more operations may include, but are not limited to, collecting the IoT device sensor data, computing the IoT device location, using a time delay of arrival (TDoA) algorithm that is verifiable on the blockchain, communicating sensor data to a remote service, such as the cloud, using the Internet backhaul associated with the MFP site, and/or recording collected data in a secure form, for example using blockchain or related technology.

According to the aspects of the example implementation, an approach is provided to configure and operate an MFP RF mesh network for receiving, relaying, processing and uplinking sensor data. The MFP RF mesh network is driven by MFP characteristics, which may include but are not limited to physical location and processor, storage, and uplink capability; MFP status, including but not limited to MFP sleep/wake state, and MFP job queue; and historical data, including but not limited to MFP power consumption and MFP job history.

Figure 2:
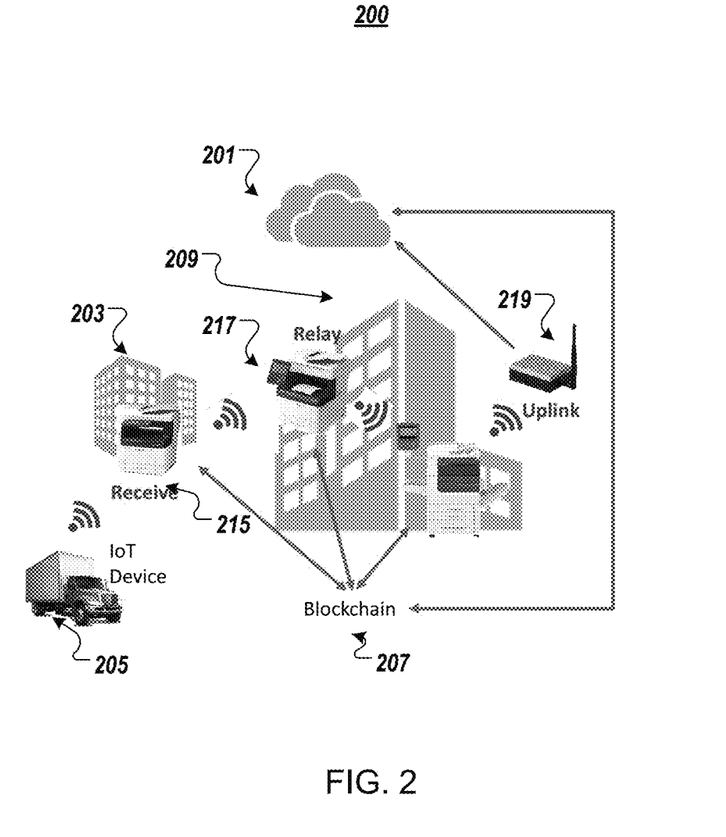
FIG. 2 illustrates the approach according to an example implementation.

FIG. 2 illustrates a system 200 according to the example implementation. More specifically, in the system 200, RF receivers 215 are deployed in MFPs, to create a low-cost LP WAN with Internet backhaul. More specifically, the MFPs are arranged in an RF mesh at geographically distinct locations 203, 209 for example, to receive (e.g., at 215), relay (e.g., at 217), process and uplink (e.g., at 219) sensor data from an IoT sensor at 205 to the cloud at 201, by using the Internet backhaul associated with the MFP site. Related art TDoA and blockchain approaches at 207 are used.

According to the example implementations, the MFPs are used as the platform for the low-cost LP WAN for IoT applications. Aspects of the example implementations are directed to configuration of the RF mesh, as well as operation of the RF mesh. With respect to RF mesh configuration, network topology is optimized based on MFP characteristics. For example, but not by way of limitation, the MFPs may have varying RF reception capabilities based on various factors, such as physical location.

In one example, an MFP may be located deep inside a building, without a clear line of sight to areas or regions where IoT devices may be positioned. As a result, those MFPs may have a reduced ability to receive IoT device sensor data. In another example, an MFP may have varying compute and storage capabilities. For example, lower end MFPs may have application specific integrated circuits (ASICs), which cannot be used for additional or alternative processing.

Other aspects of the example implementations are directed to operation of the RF mesh. For example, the RF mesh operation may be directed to minimization of MFP power consumption, and thus operate with MFP power saving features, such as sleep/wake modes. Further, the example implementation may balance use of host power of the MFP and Internet connectivity, for example.

FIGS. 3A-3D illustrate an RF mesh configuration process 300 according to an example implementation. In the example implementation, MFPs with sufficient RF visibility to IoT devices are used as receiver nodes, while other MFPs may be automatically tagged based on their capabilities, as explained in further detail below. For example, but not by way of limitation, MFPs with sufficient RF visibility (e.g., >−70 dBm) to nearest MFP neighbors may be tagged as relay nodes, MFPs with sufficient processing power (e.g., >1 GHz) may be tagged as processing nodes, and MFPs with reliable backhaul (e.g., 0.5 Mbps upload/download) may be tagged as uplink nodes. Additionally, non-MFP nodes may be added as needed, to complete the network. Further, geo-coordinates of receiver nodes are registered during commissioning. The registering may be performed by a service technician, or by using GPS/GMSS hardware that is embedded in the MFP. Optionally, a sensor may be provided to detect MFP location changes that may require re-registration. In one example implementation, power cycling the MFP may flag the MFP as requiring re-registration.

Figure 3A:
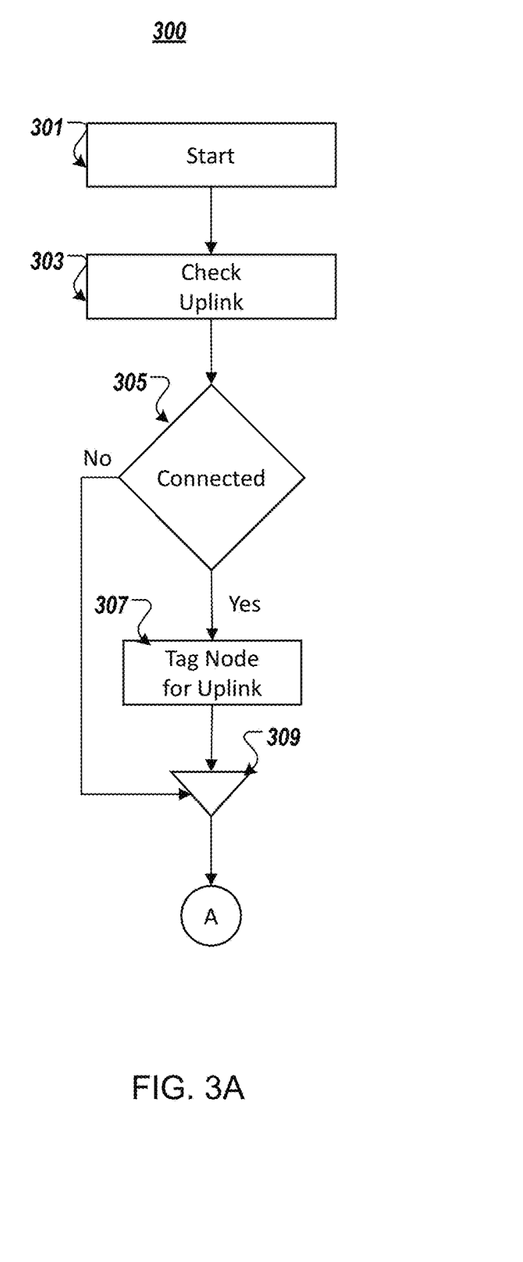
FIGS. 3A-3D illustrate a process of RF WAN configuration by node tagging, according to an example implementation.

As shown in FIG. 3A, once an RF WAN configuration process is started at 301, an uplink capability of each MFP in the network is checked at 303. For each MFP that is determined to be connected at 305, that MFP is tagged at 307 as a node that can be used as an uplink node. For each MFP that is determined not to be connected at 305, operation 307 is skipped, and at 309, the process of tagging uplink nodes is completed, and at A, the process proceeds to FIG. 3B.

Figure 3B:
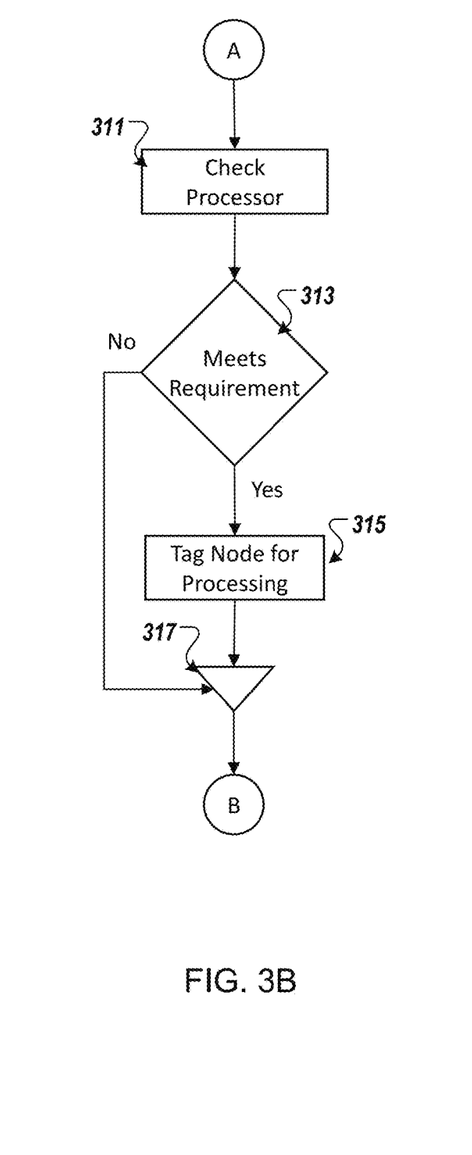

As shown in FIG. 3B, the processor of each MFP in the network is checked at 311. For each MFP that is determined to meet a processing requirement at 313, that MFP is tagged at 315 as a node for processing. For each MFP that is determined to not meet the processing requirements at 313, operation 315 is skipped and at 317, the process of tagging processing nodes is completed, and at B, the process proceeds to FIG. 3C.

Figure 3C:
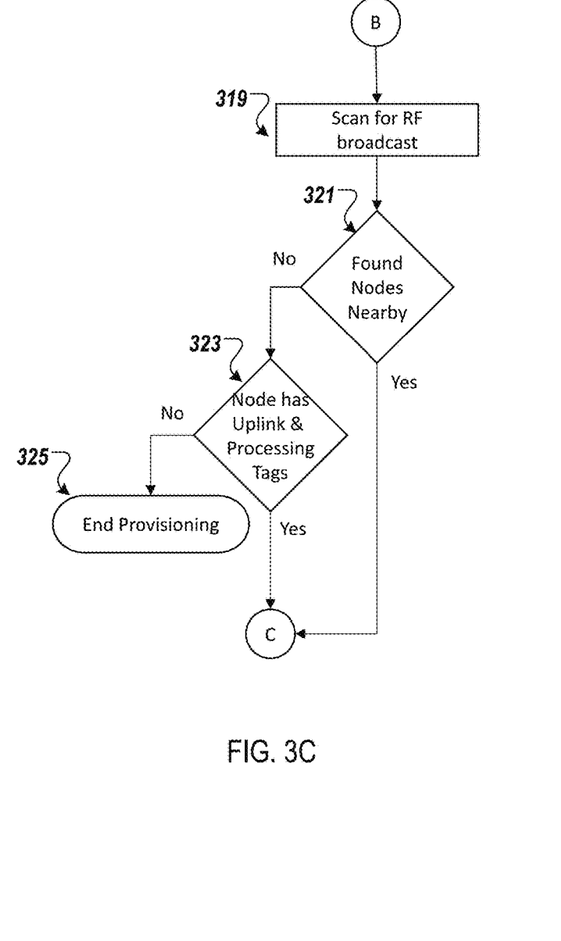

As shown in FIG. 3C, for each MFP in the network, a scan is performed for RF broadcast strength at 319 (e.g., the RF receiver of each of the MFPs scans for the ability to detect nodes nearby). For each MFP that is determined to detect nodes nearby at 321, at C the process proceeds to FIG. 3D, as explained below. For each MFP that cannot detect nodes nearby via its RF receiver at 321, that MFP is checked to determine whether it has been tagged as an uplink and/or processing node at 323. If so, at C the process proceeds to FIG. 3D as explained below. If not, then the MFP does not have sufficient capabilities to be tagged as an uplink node, a processing node or a relay node, and provisioning is ended for that MFP at 325.

Figure 3D:
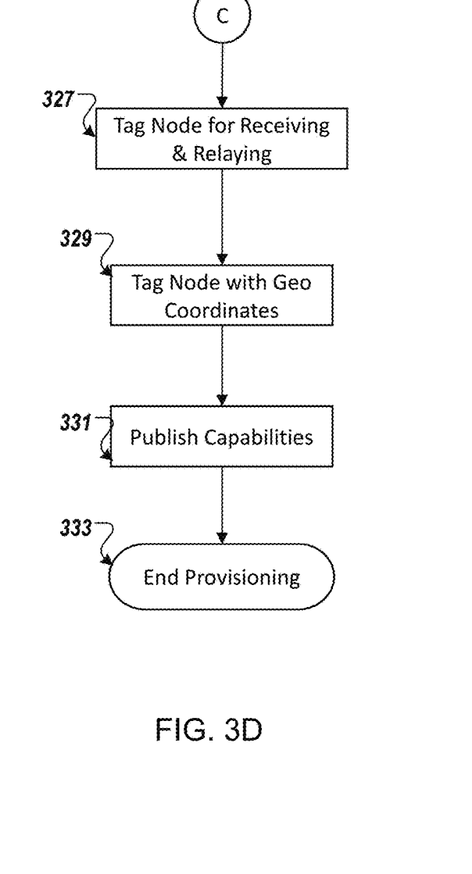

As shown in FIG. 3D, for the MFPs that are determined to be capable of receiving signals via RF receiver at 321, or having uplink and/or processing tags at 323, those MFPs are tagged as nodes for receiving and relaying at 327. At 329, those MFPs are tagged as nodes with geo-coordinates, and at 331, the capabilities of those MFPs in the RF mesh are provided, or published. At 333 the provisioning is completed.

FIGS. 4A-4E illustrate a process 400 of operation of the RF mesh, according to an example implementation. More specifically, according to the example implementation, the MFPs dynamically determine their role in the RF mesh, to expedite processing and uplink while minimizing power consumption and delays. The dynamic determination is made based on the capabilities of the MFPs, as well as their current power save and processing state, as well as the capabilities of the neighboring MFPs with respect to current power save and processing state. More specifically, a cost function is implemented that may select MFP in wake modes, to minimize delays and balance load, and select MFPs in sleep mode that are to be transitioned into wake mode.

Figure 4A:
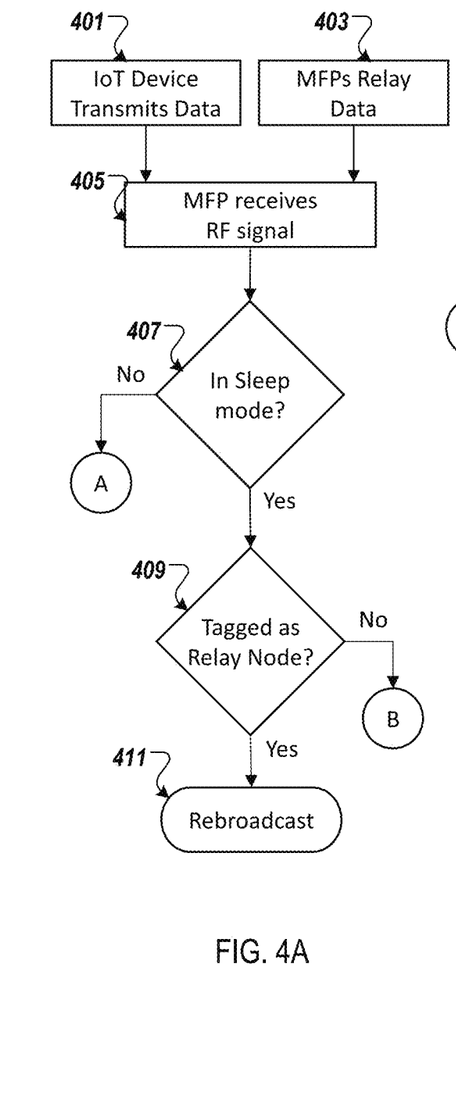
FIGS. 4A-4E illustrate a process of RF WAN operation according to an example implementation.

As shown in FIG. 4A, at 401, an IoT device, such as that associated with a delivery vehicle or the like, may transmit data. Alternatively, or in parallel, at 403, a neighboring MFP may transmit, or relay, data. At 405, the MFP receives the RF signal at its RF receiver. More specifically, at 405, the MFP receives the RF signal from the IoT device if the IoT device transmitted data at 401, and/or the RF signal from a neighboring MFP that relays data at 403.

At 407, a determination is made as to whether the MFP is in sleep mode. If it is determined at 407 that the MFP is in sleep mode, then a determination is made at 409 as to whether the MFP was tagged as a relay node during configuration of the RF mesh, as explained above. If the result of the determination at 409 is that the MFP was tagged as a relay node, then the RF signal that was received at 405 is rebroadcast at 411. The rebroadcast RF signal may be received by a neighboring MFP, for example.

Figure 4B:
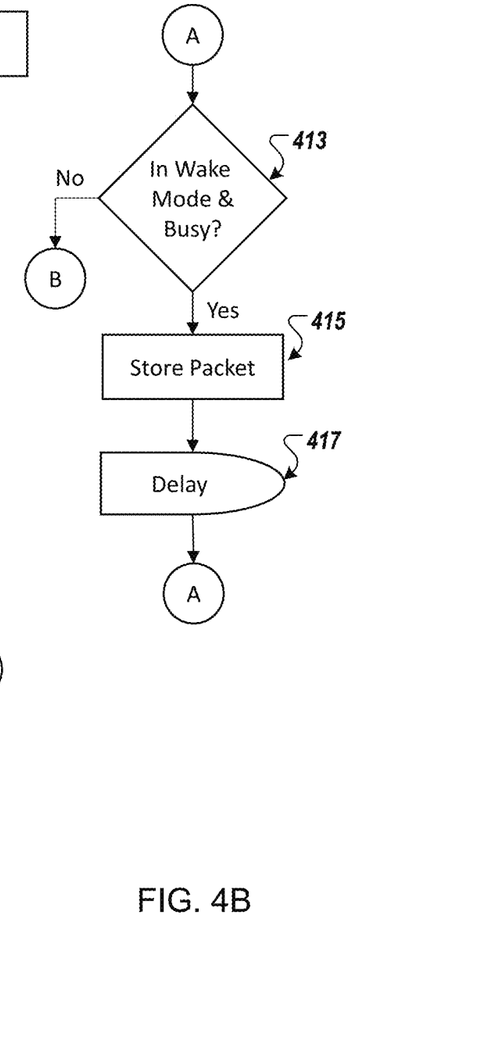

If a determination was made at 407 that the MFP is not in sleep mode, then at A, the process proceeds to FIG. 4B. At 413, a determination is made as to whether the MFP is in wake mode and is busy. If so, the packet is stored at 415, and after the current job queue is cleared, the process returns to A.

Figure 4C:
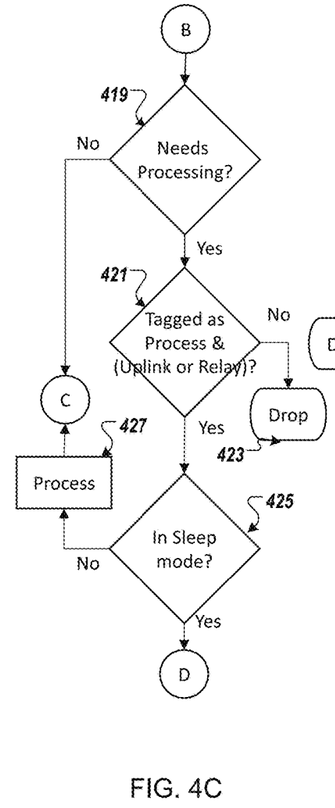

If a determination was made at 409 that the MFP is not tagged as a relay node, or a determination was made at 413 that the MFP is not in wake mode and busy, then at B, the process proceeds to FIG. 4C. At 419, a determination is made as to whether a processing operation is required based on the RF signal that was received. If so, then at 421, then a determination is made as to whether the MFP is tagged as a process node, and an uplink or relay node. If not, then the process 400 is dropped for that MFP at 423. If so, then at 425, a determination is made as to whether the MFP is in sleep mode. If the MFP is determined to be in sleep mode at 429, then at D, the process proceeds to FIG. 4E, as explained further below. If the MFP is determined to not be in sleep mode at 429, then at 427 the process that was identified at 419 is performed, and at C, the process proceeds to FIG. 4D, as explained below.

Figures 4D, 4E:
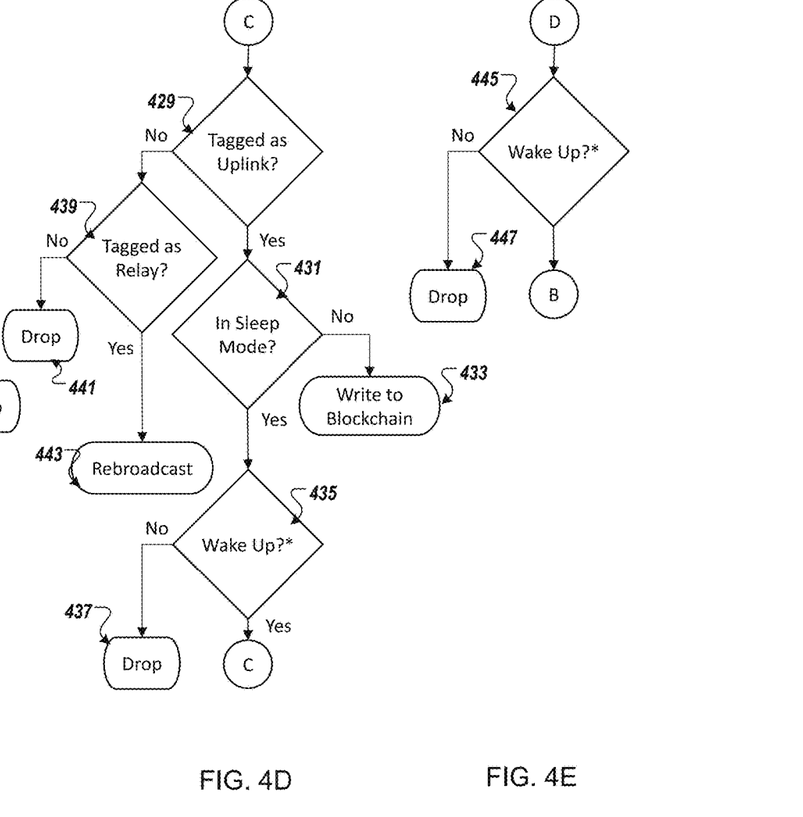

As shown in FIG. 4D, after the process was performed at 427, a determination is made at 429 as to whether the MFP is tagged as an uplink node. If so, a determination is made at 431 as to whether the MFP is in sleep mode. If not, then at 433, the MFP performs a write operation to the blockchain. If it is determined at 431 that the MFP is in sleep mode, then at 435, a determination is made as to whether to wake up the MFP, as explained in greater detail below. If the determination at 435 is to wake up the MFP, then at C, the process proceeds to operation 429, as explained above. If determination at 435 is to not wake up the MFP, then at 437 the process 400 is dropped for that MFP.

As shown in FIG. 4D, after it was determined at 425 that the MFP was in sleep mode such that the process 427 was not performed, a determination is made at 445 as to whether to wake up the MFP, as explained in greater detail below. If the determination at 445 is to wake up the MFP, then at B, the process proceeds to operation 419, as explained above. If the determination at 445 is to not wake up the MFP, then at 447 the operation 400 is dropped for that MFP.

According to the foregoing example implementation, MFPs that are in the wake mode are selected, so as to minimize delays. For example, but not by way of limitation, idle MFPs are selected before busy MFPs. For the busy MFPs, those MFPs with lower current computational loads ($C_L$) are selected, so as to minimize delays. For example, but not by way of limitation, the selection may be based on the following relationship:

$$F = \min f_{CL}(M_i) \text{ if } I = \emptyset, I = \{M_i | f_A(M_i) = \text{Idle}\} \forall M_i \in N \text{ neighbors} \quad (1)$$

With respect to the determination as to whether to wake up the MFP, such as at 435 and/or 445 as described above, the following criteria may be applied to the determination, to generate the relationship shown in (2):

Ability to complete the process on its own or using neighbors, i.e. cost of relay (R)

Likelihood to wake up for a job (based on job history) ($L_J$)

Expected route of IoT devices ("Wake Path"), i.e. likelihood of a transmission ($L_T$)

$$F = \max f(f_{R,i}, L_{T,i}, L_{J,i}), f_{R,i} = \min f_R(M_j, L_{J,j}, L_{T,j}) \forall M_i, M_j \in N \text{ neighbors} \quad (2)$$

With respect to the RF mesh operation, load-balancing of the MFPs may also be performed based on past power consumption (P). For example but not by way of limitation, the load-balancing may be based on the relationship $$F = \min \max f_P(M_i) \forall M_i \in N \text{ neighbors} \quad (3)$$

Accordingly, aspects of the forgoing example implementations, for the wake path, locations of network gateways such as MFPs are known, the locations of sensors that are passing through the network are known. Thus, an estimated route can be determined for the sensors, so as to wake sleeping MFPs, to be ready for network transmissions.

Further, aspects of the example implementation provide for an ability to complete processing and uplink while ensuring that nodes are not woken up when they cannot complete the processing and uplink on their own or via the neighboring nodes of the network. Further, neighboring MFPs can share state information and capabilities via the RF mesh, such that every node about the nodes in the mesh. Moreover, an MFP that is in sleep mode may safely drop a transmission to conserve power, if there are MFPs that are proximal to that MFP, which are away and are capable of handling the load.

According to the example implementations, MFP job history is used heuristically, to determine that transitioning to wake mode does not increase average power consumption, as the MFP is likely to be woken up to process one of its functions, such as print, scan, copy, fax, etc.

Further, the implementation of blockchain according to the example implementations may have additional aspects. For example, but not by way of limitation, the IoT device may be authenticated via cryptographic handshake using the blockchain, so as to provide for IoT device security. Further, MFP hosts may be credited, such as for their use of power and Internet, via tokens that are recorded on the blockchain.

In this regard, the owners or lessors of the MFPs, such as convenience stores, may be able to receive credit for the power and Internet that is used by the network, and may be given an incentive to include their MFPs in the RF mesh. For example, during peak demand periods, extra credits may be provided for use of power and Internet. Additionally, the MFP blockchain network may be used for customers to purchase tokens, to pay for the services associated with the MFP blockchain network.

The example implementations may also include a token credit system, for owners and/or operators of the MFPs in the RF mesh network to be able to receive credits that may be applied for products and services. More specifically, according to an example implementation, micro credits may be provided to a user where the user participates in the RF mesh network. The balance of the accrued credits, such as for Internet and power usage, may be maintained in the system, and outstanding credits may be applied towards any balances due, or exchanged for value towards purchase of products or services. Activities that may qualify for providing one or more users with credit may include, but are not limited to, the receipt and transmission of IoT data from devices via the local Internet connection of the MFP, and for the processing, storage, transmission or verification of any sensor or transactional data that is related to the operation of the RF mesh network.

Figure 5:
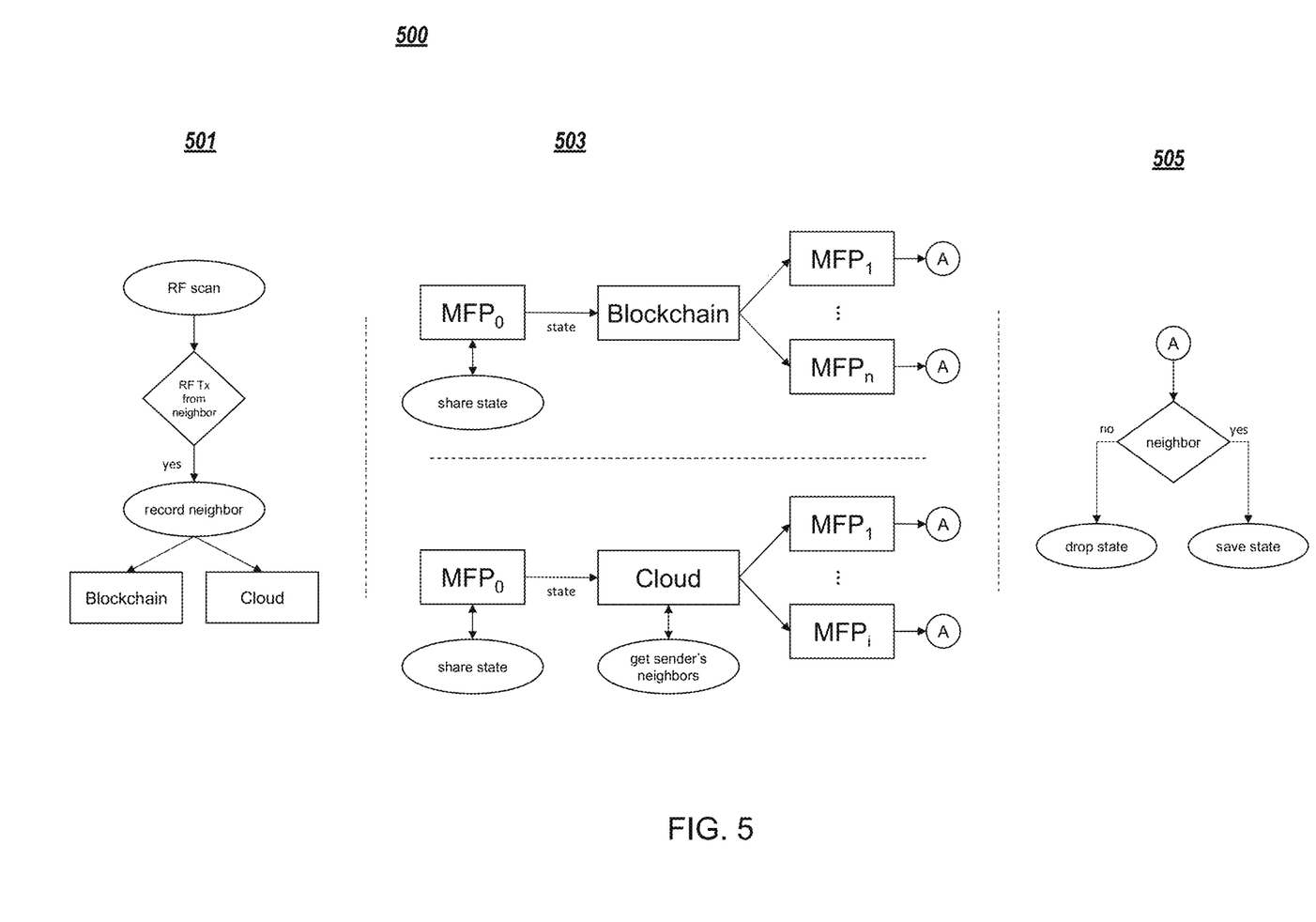
FIG. 5 illustrates functional and entity relations for state sharing according to an example implementation.

FIG. 5 provides a schematic illustration of the power state and capability sharing functionality 500 according to the example implementations. As shown in 501, an MFP may perform a scan for signals with its RF receiver. More specifically, the MFP is scanning to detect an RF signal from one or more neighboring MFPs. If the MFP detects, via its RF receiver, a signal that was transmitted from one or more neighboring MFPs, then the MFP may associate the one or more neighboring MFPs as neighbors. Further, this result may be provided to the blockchain network, and/or the cloud.

As shown in 503, the MFP may output a signal that provides state information, so as to share the state with any neighboring MFPs that may be able to utilize the state to make processing decisions (e.g., once the state has been detected or sensed). For example, the state may be indicative of a sleep/wake condition of the MFP, or an ability of the MFP to process, store and/or relay information, such as the node status of the MFP. The MFP may then share this information of the state (e.g., capabilities) as well as the recorded neighbor information described above with respect to 501, with the blockchain network. Similarly, the state information may be shared with the cloud. Accordingly, the blockchain network and cloud may also communicate state information with other MFPs. Optionally, the cloud may also be able to use other information to obtain identification information of the neighboring MFPs. In other words, the detection and recording of the neighboring MFPs may occur intermittently, and need not be synchronous with the sharing of state information. However, in the example implementation directed to the cloud, the cloud may intelligently distribute the shared state information, for example, by reading the list of neighboring MFPs from its data store, thus substantially minimizing network traffic.

At 505, for each of the other MFPs that have received, from the blockchain network and/or the cloud, information about the state of the MFP as explained above, those other MFPs may determine whether the MFP is characterized as a neighbor. If so, the MFP state information is saved; if not, the MFP state information is dropped.

Figure 6:
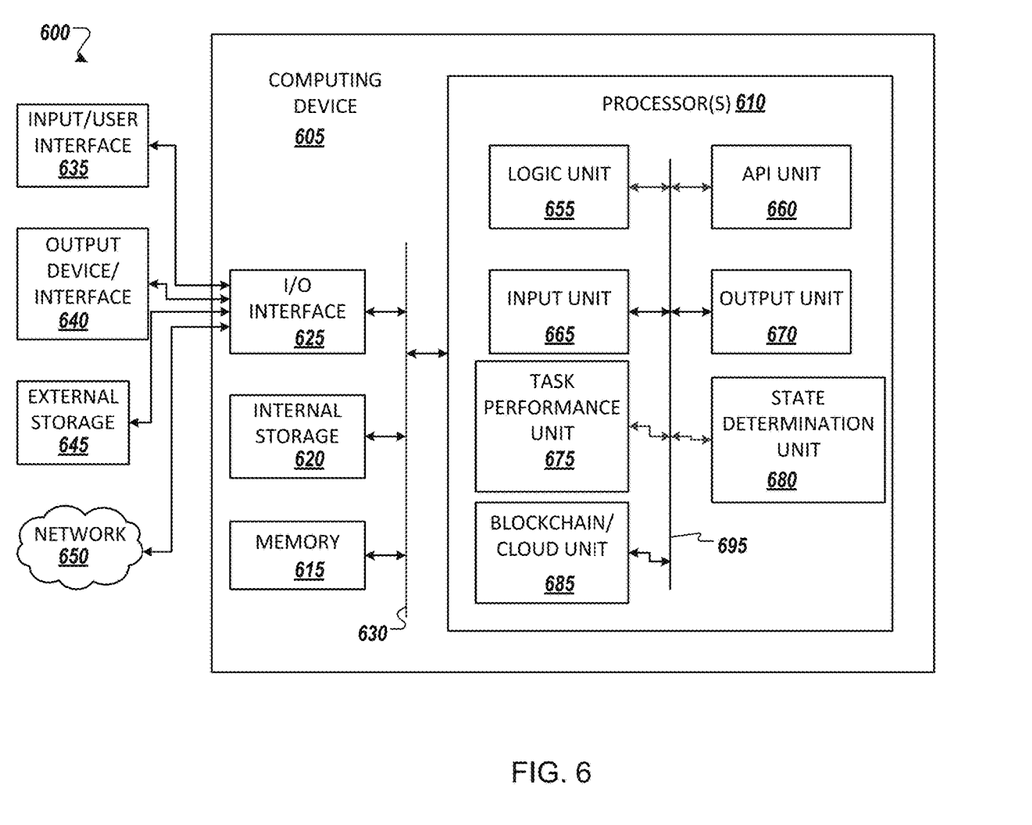
FIG. 6 illustrates an example computing environment with an example computer device suitable for use in some example implementations.

FIG. 6 illustrates an example computing environment 600 with an example computer device 605 suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/interface 635 and output device/interface 640. Either one or both of input/interface 635 and output device/interface 640 can be a wired or wireless interface and can be detachable. Input/interface 635 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 640 may include a display, television, monitor, printer, speaker, braille, or the like. In some example implementations, input/interface 635 (e.g., user interface) and output device/interface 640 can be embedded with, or physically coupled to, the computing device 605. In other example implementations, other computing devices may function as, or provide the functions of, an input/interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like). As disclosed in the forgoing drawings and descriptions, the computing device 605 include one or more MFPs, a blockchain network, one or more devices in the cloud, and/or one or more devices associated with the IOT sensor.

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as, a server, client, thin server, general machine, special-purpose machine, or another label. For example but not by way of limitation, network 650 may include the blockchain network, and/or the cloud. As explained above, the example implementations herein do not require any cellular network, and can be implemented using the RF mesh network, with only RF transmission and reception, and IOT transmission and reception, with Internet backhaul via the MFP Internet connection.

I/O interface 625 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 610 can execute under any operating system (OS) (not shown), in a native or virtual environment. One or more applications can be deployed that include logic unit 655, application programming interface (API) unit 660, input unit 665, output unit 670, task performance unit 675, state determination unit 680, blockchain/cloud unit 685, and inter-unit communication mechanism 695 for the different units to communicate with each other, with the OS, and with other applications (not shown).

For example, the task performance unit 675, the state determination unit 680, and the state determination unit 685 may implement one or more processes shown above with respect to the structures described above. The described units and elements can be varied in design, function, configuration, or implementation and are not limited to the descriptions provided.

In some example implementations, when information or an execution instruction is received by API unit 660, it may be communicated to one or more other units (e.g., logic unit 655, input unit 665, task performance unit 675, state determination unit 680, and blockchain/cloud unit 685).

For example, the task performance unit 675 may receive and process instructions associated with performing a task-based on a state. Depending on the categorization of the node as relay node, processing node, and/or uplink node, the task performance unit 675 may perform an operation of relaying for communicating information to a neighboring MFP if the MFP has been tagged as a relay node, performing a processing operation if the MFP has been tagged as a processing node, and/or performing an uplink operation if the MFP has been tagged as an uplink node. For the MFP having been tagged as an uplink node, the task performance unit 675 may interface with blockchain/cloud unit 685, which interacts with the blockchain network and the cloud, depending on the node categorization and the state of the MFP. Further, the state determination unit 680 may receive and process information to determine and potentially transition a state of the MFP. For example but not by way of limitation, the state of the MFP may be transitioned between sleep mode and wake mode, as explained above, so as to select the MFP that minimizes delay, while also balancing for power consumption, and MFP capabilities as determined by the configuration process of the node tagging as explained above.

In some instances, the logic unit 655 may be configured to control the information flow among the units and direct the services provided by API unit 660, input unit 665, task performance unit 675, state determination unit 680, and blockchain/cloud unit 685 in some example implementations described above. For example, the flow of one or more processes or implementations may be controlled by logic unit 655 alone or in conjunction with API unit 660.

Figure 7:
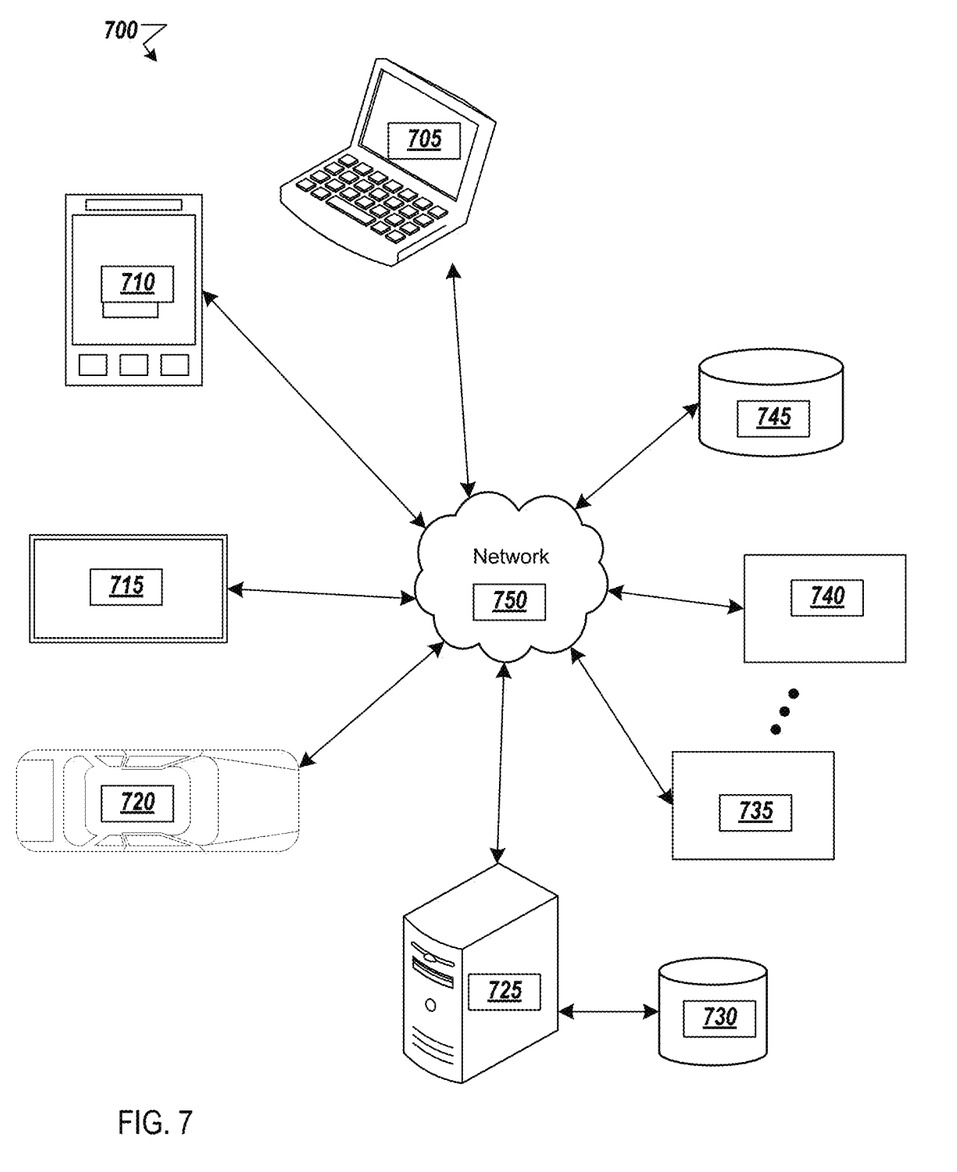
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing devices 605 described in FIG. 6, respectively. Devices 705-745 may include, but are not limited to, a computer 705 (e.g., a laptop computing device) having a monitor and an associated webcam as explained above, a mobile device 710 (e.g., smartphone or tablet), a television 715, a device associated with a vehicle 720, a server computer 725, computing devices 735-740, storage devices 730 and 745. As noted above, the devices may include, or be associated with, MFPs having RF transmitters and receivers.

In some implementations, devices 705-720 may be considered user devices associated with the users of the enterprise. Devices 725-745 may be devices associated with service providers (e.g., used by the external host to provide services as described above and with respect to the various drawings, and/or store data, such as webpages, text, text portions, images, image portions, audios, audio segments, videos, video segments, and/or information thereabout).

Optionally, the example implementations may be directed to non-MFP devices that have similar or related characteristics to MFP devices, such that they are integrated into an RF mesh for IoT applications, as explained above. Further, a collection of MFP or non-MFP devices may be transformed into an RF mesh for applications other than IoT applications. For example but not by way of limitation, the non-IoT applications may include, but are not limited to, peer-to-peer messaging without requiring the use of a cellular network, such as by employing the MFP mesh; printing to remote MFPs via the MFP mesh; scanning from one MFP so as to print at another MFP via the MFP mesh; scanning from one MFP to store at another MFP via the MFP mesh; and for receiving a facsimile and one MFP to print at another MFP via the MFP mesh.

The foregoing example implementations may have various benefits and advantages over the related art. For example, but not by way of limitation, the example implementations provide an approach to use MFPs as the platform for a low-cost LP WAN for IoT applications. More specifically, the example implementations may overcome related art issues associated with power consumption by minimizing power consumption in a manner that is integrated with the power saving features of the MFPs, and by balancing the use of the host power and Internet connectivity of the MFPs. Thus, the example implementations may provide methods and systems that can configure and/or operate the MFP RF mesh based on MFP characteristics, including but not limited to physical location and processor, storage and uplink capabilities; MFP status, including sleep/wake state and job queue; and historical data, including but not limited to MFP power consumption and MFP job history.

In contrast to related art LP WANs that employ dedicated RF devices, the example implementations use MFPs to create the LP WAN. As a result, existing MFPs that are already deployed can be used in a manner that permits for a rapid creation of the RF mesh network. Further, in contrast to related art supply chain applications that use blockchain, MFPs are used in the example implementations for supply chain monitoring. The functions associated with the MFPs are integrated into the functionality and support for the LP WAN.

Additionally, aspects of the example implementations may utilize existing connections so as to provide a superior cost of coverage ratio with respect to related art technologies. As a result, the example implementations may be able to rapidly deploy anchors in sufficiently high concentrations to provide accurate, low powered and verifiable geolocation capabilities for IoT devices, using triangulation. In contrast, related art technologies must deploye expensive, proprietary and heavily regulated infrastructure, to achieve sufficiently high densities for triangulation. Alternatively, where related art technologies used on device GPS instead of triangulation, there are security risks, such as spoofing, and a high amount of power is consumed, such that widespread deployment of IoT devices on such on-device GPS alternatives is costly to maintain, and accessible in only the use cases that have a high return on investment.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of managing a low-power wide area blockchain network having multifunction printers (MFPs) as nodes in a radio frequency (RF) mesh, comprising:
 configuring the RF mesh based on MFP characteristics including RF reception, compute, storage and uplink, for each of the MFPs;
 determining at least one of an Internet backhaul reliability, processing power, and an RF visibility for an MFP of the MFPs;
 based on a result of the determining, tagging the MFP as at least one of a relay node, a processing node, and an uplink node; and
 operating the RF mesh to dynamically determine a role of the MFPs based on the MFP characteristics, current power save and processing state, for each of the MFPs and its neighboring MFPs, based on a function that minimizes delay, balances load and/or transitions MFPs between a sleep mode and a wake mode.

2. The method of claim 1, wherein the determining the Internet backhaul reliability comprises checking an uplink between the MFP and the Internet, and for the uplink between the MFP and the Internet being connected, tagging the MFP as the uplink node.

3. The method of claim 1, wherein the determining the processing power comprises checking a processor of the MFP, and for the processor meeting a processing capability requirement, tagging the MFP as the processing node.

4. The method of claim 1, wherein the determining the RF visibility comprises an RF receiver of the MFP performing a scan operation to receive an incoming RF broadcast signal, and for the scan operation resulting in identification of one or more of the neighboring MFPs based on the incoming RF broadcast signal, or for the MFP being tagged as an uplink node and/or a processing node, tagging the MFP as the relay node.

5. The method of claim 1, further comprising, after the tagging of the MFP as the relay node, the processing node, and/or the uplink node, further tagging the MFP with geo-coordinates, and providing capability information associated with the MFP in the blockchain network.

6. The method of claim 5, wherein the geo-coordinates of the MFP are registered during commissioning by a technician or by using location detecting hardware in the MFP, and requiring re-registration of the MFP when a location of the MFP changes, or based on a power-cycling of the MFP.

7. The method of claim 1, further comprising additional nodes in the RF mesh that are not MFPs.

8. The method of claim 1, wherein the MFP characteristics further comprise a physical location of the MFPs, and wherein the operating the RF mesh is performed based on MFP status that comprises one or more of a sleep/wake state and a job queue of the MFP, and MFP historical data that comprises one or more of a power consumption and a job history of the MFP.

9. The method of claim 1, wherein the operating comprises:
(a) the MFP receiving an RF signal, and for the MFP being the relay node in the sleep mode, rebroadcasting the RF signal;
(b) for the MFP not being in the sleep mode and being in a busy state, storing information associated with the RF signal at the MFP;
(c) for the MFP not being in the sleep mode and not being in the busy state, or the MFP not being the relay node and the MFP being in the sleep mode, determining if the RF signal requires processing;
(d) for the RF signal requiring processing and the MFP being the process node,
when the MFP is not in the sleep mode, performing the processing, and
when the MFP is in the sleep mode, determining whether to transition the MFP from the sleep mode to the wake mode, and for a determination to transition the MFP from the sleep mode to the wake mode, transitioning the MFP from the sleep mode to the wake mode and performing the (c);
(e) after the processing, or if the RF signal does not require the processing,
for the MFP being an uplink node not in the sleep mode, writing the RF signal to the blockchain network, or
for the MFP not being the uplink node and the MFP being the relay node, performing the rebroadcasting, or
for the MFP being the uplink node in the sleep mode, determining whether to transition the MFP from the sleep mode to the wake mode, and for the determination to transition the MFP from the sleep mode to the wake mode, transitioning the MFP from the sleep mode to the wake mode and performing the (e).

10. The method of claim 9, wherein the operating further comprises selecting an idle one of the MFPs before selecting a busy one of the MFPs, and the busy one of the MFPs having a low or current computational load to minimize delay.

11. The method of claim 10, wherein the selecting the busy one of the MFPs is performed based on:

$$F=\min f_{CL}(M_i) \text{ if } I=\emptyset, I=\{M_i|f_A(M_i)=\text{Idle}\} \forall M_i \in N \text{ neighbors.}$$

12. The method of claim 9, wherein the determining whether to transition the MFP from the sleep mode to the wake mode is based on a cost of relay (R) including an ability of the MFP to complete a process on its own or using neighbors, a likelihood of the MFP to wake up, and a likelihood of transmission ($L_T$) including an expected route of an IoT device that transmits the RF signal.

13. The method of claim 12, wherein the determining whether to transition the MFP from the sleep mode to the wake mode is performed based on:

$$F=\max f(f_{R,i}, L_{T,i}, L_{J,i}), f_{R,i}=\min f_R(M_j, L_{J,j}, L_{T,j}) \forall M_i, M_j \in N \text{ neighbors.}$$

14. The method of claim 9, wherein MFP load is balanced based on past power consumption (P).

15. The method of claim 14, wherein the MFP load is balanced based on:

$$F=\min \max f_P(M_i) \forall M_i \in N \text{ neighbors.}$$

16. The method of claim 1, wherein the low-power wide area blockchain network does not use a cellular communication network.

17. A low-power, wide area blockchain network comprising:
multi-function printers (MFPs) as nodes in an RF mesh, wherein one or more of the MFPs is connected via the Internet to a cloud network, and each of the MFPs includes an RF receiver that is configured to receive an RF signal from neighboring ones of the MFPs and an IoT device; and
a blockchain network coupled to the multifunction printers,
wherein the RF mesh is configured based on MFP characteristics including RF reception, compute, storage and uplink, for each of the MFPs, wherein configuring the RF mesh comprises:
determining at least one of an Internet backhaul reliability, processing power, and an RF visibility for an MFP of the MFPs, and
based on a result of the determining, tagging the MFP as at least one of a relay node, a processing node, and an uplink node; and
the RF mesh is operated to dynamically determine a role of the MFPs based on the MFP characteristics, current power save and processing state, for each of the MFPs and its neighboring MFPs, based on a function that minimizes delay, balances load and/or transitions MFPs between a sleep mode and a wake mode.

18. The network of claim 17, wherein the determining the Internet backhaul reliability comprises checking an uplink between the MFP and the Internet, and for the uplink between the MFP and the Internet being connected, tagging the MFP as the uplink node, the determining the processing power comprises checking a processor of the MFP, and for the processor meeting a processing capability requirement, tagging the MFP as the processing node, and the determining the RF visibility comprises an RF receiver of the MFP performing a scan operation to receive an incoming RF broadcast signal, and for the scan operation resulting in identification of one or more of the neighboring MFPs based on the incoming RF broadcast signal, or for the MFP being tagged as an uplink node and/or a processing node, tagging the MFP as the relay node, and further wherein, after the tagging of the MFP as the relay node, the processing node, and/or the uplink node, further tagging the MFP with geo-coordinates, and providing capability information associated with the MFP in the blockchain network.

19. The network of claim 18, wherein the RF mesh is operated by:
 (a) the MFP receiving an RF signal, and for the MFP being the relay node in the sleep mode, rebroadcasting the RF signal;
 (b) for the MFP not being in the sleep mode and being in a busy state, storing information associated with the RF signal at the MFP;
 (c) for the MFP not being in the sleep mode and not being in the busy state, or the MFP not being the relay node and the MFP being in the sleep mode, determining if the RF signal requires processing;
 (d) for the RF signal requiring processing and the MFP being the process node,
  when the MFP is not in the sleep mode, performing the processing, and
  when the MFP is in the sleep mode, determining whether to transition the MFP from the sleep mode to the wake mode, and for a determination to transition the MFP from the sleep mode to the wake mode, transitioning the MFP from the sleep mode to the wake mode and performing the (c);
 (e) after the processing, or if the RF signal does not require the processing,
  for the MFP being an uplink node not in the sleep mode, writing the RF signal to the blockchain network, or
  for the MFP not being the uplink node and the MFP being the relay node, performing the rebroadcasting, or
  for the MFP being the uplink node in the sleep mode, determining whether to transition the MFP from the sleep mode to the wake mode, and for the determination to transition the MFP from the sleep mode to the wake mode, transitioning the MFP from the sleep mode to the wake mode and performing the (e).

\* \* \* \* \*